United States Patent

[11] 3,578,759

| [72] | Inventor | Takeo Yamazaki<br>Anjo-shi, Japan |
|---|---|---|
| [21] | Appl. No. | 845,436 |
| [22] | Filed | July 28, 1969 |
| [45] | Patented | May 18, 1971 |
| [73] | Assignee | Aisin Seiki Kabushiki Kaisha<br>Kariya, Japan |
| [32] | Priority | Aug. 3, 1968 |
| [33] | | Japan |
| [31] | | 43/55048 |

[54] FOOT-OPERATED HAND-RELEASED BRAKE OF THE VEHICLE
5 Claims, 4 Drawing Figs.

[52] U.S. Cl. ................................................ 74/540,
74/529
[51] Int. Cl. ..................................................... G05g 1/14
[50] Field of Search ........................................ 74/540,
481, 479, 577, 530, 529; 188/(Inquired)

[56] References Cited
UNITED STATES PATENTS
3,364,784  1/1968  Mellen .......................... 74/540
3,459,065  8/1969  Fender .......................... 74/530X

*Primary Examiner*—Fred C. Mattern, Jr.
*Assistant Examiner*—F. D. Shoemaker
*Attorney*—Pierce, Scheffler and Parker

ABSTRACT: A foot-operated and hand-released brake of the vehicle in which a pedal is oscillatably pivoted by a shaft rotatably mounted on a bracket and an internal gear is carried on the shaft rotatably and eccentrically to the shaft. The rotation of the shaft swings the internal gear in mesh with an external gear provided on the pedal concentrically to the shaft, and rotating the internal gear with a speed largely reduced due to the slight difference in the number of teeth in the gears. An arm fixed to the internal gear releases the brake cable depending on the amount of the rotation of the shaft.

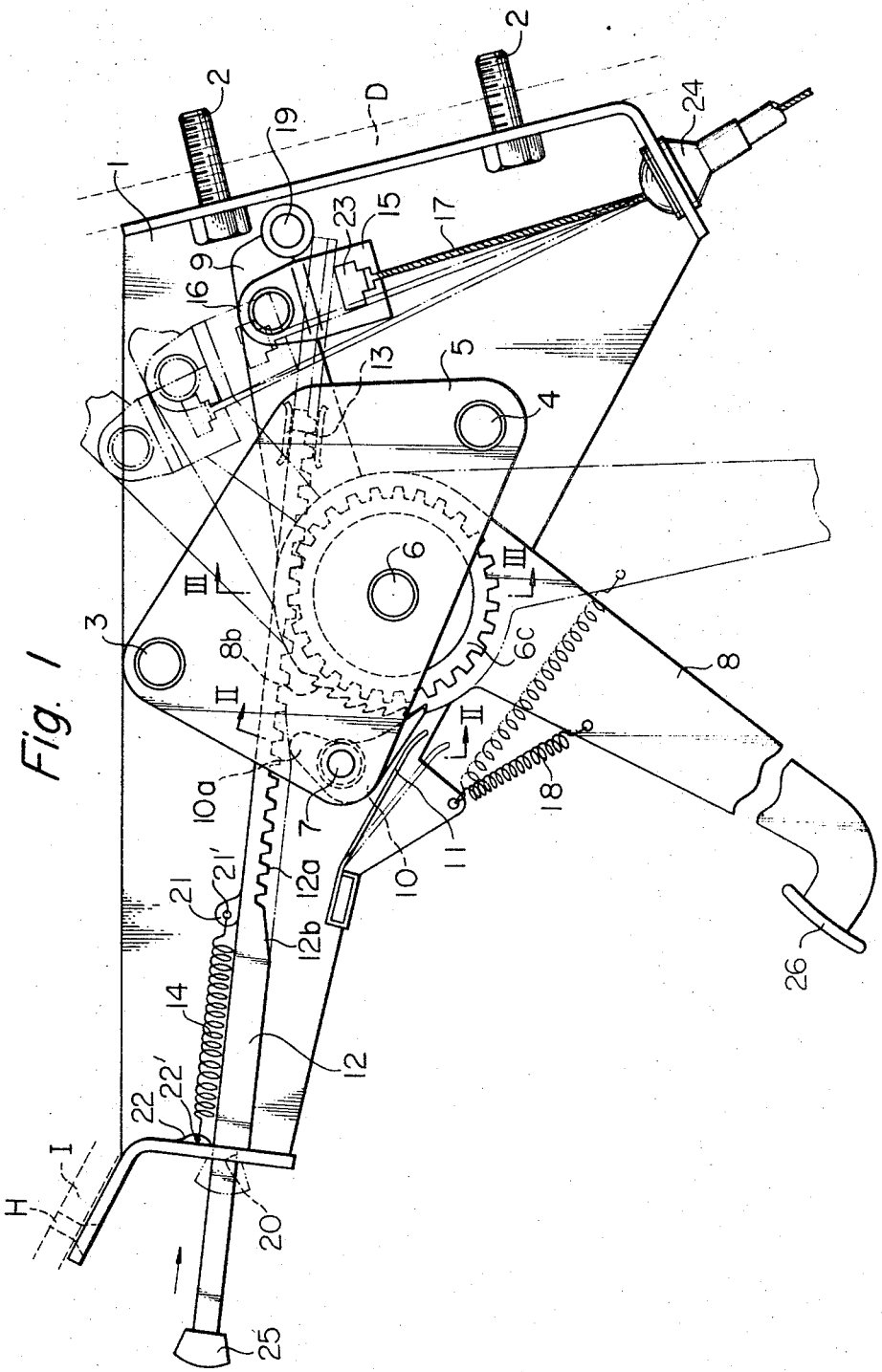

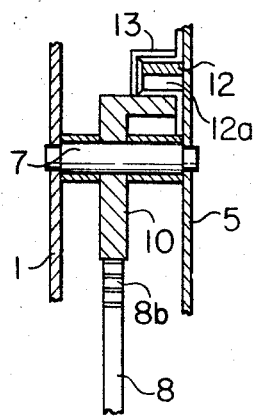
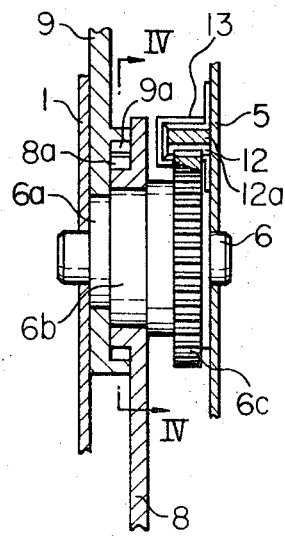
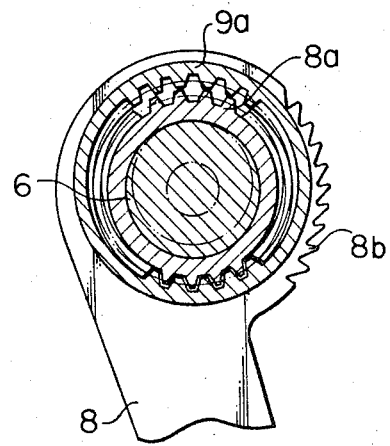

3,578,759

FOOT-OPERATED HAND-RELEASED BRAKE OF THE VEHICLE

BACKGROUND OF THE INVENTION

This invention relates to improvement in foot-operated parking brakes of the vehicle and more particularly brake levers of the type that are adaptable to be used for obtaining a moderated release.

Foot-operated and hand-released parking brakes of the vehicle have heretofore been known in the art, which have various objections, the principal one being unobtainability of a moderated release which would prevent an accidental engine stop and inhibit the vehicle to run free, when the vehicle is just about to start to travel after parking is terminated on an inclined road.

In view of the above-mentioned undesirable and disadvantageous features, drivers have been required to devote their full attention to release the parking brake quietly in synchronism with the engagement of the clutch of the transmission mechanism while accelerating the engine enough to bear the heavy load of starting travel. It requires accordingly a long time of experience for drivers to gain a faculty to start travel of the vehicle without an accidental stoppage of the engine and permit free running of the vehicle when the vehicle is about to start travel after-parking is terminated on an inclined road.

From the fact above-mentioned it may fairly safely be said that the unavailability of the moderated release of the conventional parking brake of the vehicle is now a problem for which a solution is demanded.

The present invention is directed to a provision of a moderated release of the parking brake by the use of a compound differential gear speed reducer, designed to give a large reduction in a unit of small size which makes possible the large speed ratio between the driver and the follower.

The present invention is designed to provide a novel arrangement for obtaining a moderated release of a foot-operated brake lever of the vehicle.

Another object of the present invention is to provide an improved hand-operated release construction for a foot-operated brake lever.

SUMMARY OF THE INVENTION

In the parking brake of the present invention, a brake lever is oscillatably pivoted, on the edge of which is provided an arcuate series of ratchet teeth in a disengageable and normally engaged connection with a pawl spring biased toward engagement with the ratchet teeth to keep the pedal in its incrementally set position. An internal gear is eccentrically and rotatably carried on the shaft of the pivoting of the pedal, the revolution of which swings the internal gear into mesh with an external gear provided on the pedal concentrically to its pivoting, and rotating an arm fixed to the internal gear, with a speed due to the difference in the number of teeth in the gears, whereby the large speed ratio is obtained between the pull rod which rotates the shaft and the arm fixed to the internal gear, thus any desirable amount of release of the parking brake is made possible.

The present invention is illustrated in the accompanying drawings.

BRIEF DESCRIPTION OF THE DRAWING

FIG. 1 is a side view of a parking brake assembly made in accordance with the present invention, FIG. 2 and 3 are sectional views taken along the line II–II and III–III of FIG. 1 respectively, and FIG. 4 is a sectional view taken along the line IV–IV in FIG. 3.

Similar reference numerals are applied to similar parts throughout these views.

DESCRIPTION OF THE PREFERRED EMBODIMENT

Referring first to FIG. 1, the reference numeral 1 designates a sheet-metal-supporting bracket of generally triangular form that is adapted to be bolted at its forward end to the dash D by means of stud 2 and also to be secured at its rear end to the bottom of the instrument board I by means of bolts entered into hole H. A plate 5 is riveted to the bracket 1 by means of the upset opposite ends of two pins 3 and 4, in parallel and spaced relation with the bracket 1, and shaft 6 is rotatably mounted between the bracket 1 and plate 5 as shown in FIG. 3. The shaft 6 has two steps 6a and 6b, an external gear 6c being provided concentrically to the shaft on its end portion. The step 6a has a periphery eccentric to the shaft 6 while step 6b has a concentric periphery to the shaft. An internal gear 9a is carried on the step 6a and an external gear 8a is carried on the step 6b so that the revolution of the shaft 6 swings the internal gear into mesh with the external gear 8a while rotating the internal gear about the step 6a with a speed due to the difference in the number of teeth in the gears. The gear 6c meshes with rack 12a of pull rod 12 so that pushing of the rod 12 along the direction indicated by the arrow in FIG. 1 causes rotation of the shaft 6, and in turn the step 6a. It will be understood that these gears and the shaft compose a compound differential gear speed reducer designed to give a large reduction in a unit of small size. Pedal 8 is fixed to the gear 8a, on the edge of which is provided an arcuate series of ratchet teeth 8b in a disengageable and normally engaged connection with a pawl 10 pivoted on the bracket and spring biased toward engagement with the ratchet teeth under a force of the leaf spring 11.

Arm 9 is fixed to the internal gear 9a, to the end of which is attached a brake cable 17. Spring 18 has one end anchored in the small hole of the pedal 8 and the other end in the small hole of the bracket as shown in FIG. 1 so that the pedal 8 is normally urged to hold itself in its retracted position as shown in heavy line. The substantially horizontal pull rod 12 is reciprocable in a pair of substantially horizontal guides 13 and in a bearing hole 20 in the rear end of the bracket, and is normally spring biased to the left in FIG. 1 by a coiled tensioned spring 14 stretched between a hole 21' of a lug 21 projected from the rod and a hole 22' of a lug 22 projected at the rear flanged portion of the bracket 1. The cam surface 12b of the rod 12 is engageable with the upper end 10a of the pawl 10 when the rod is fully pushed to the right in its previously given stroke so that the engagement between the pawl and the ratchet teeth is released. The arm 9 is pivotally connected as at 16 to clevis 15 onto which the end of the parking brake cable 17 is attached in keyhole slot 23. The cable 17 is reciprocable in a bearing grommet 24 mounted in a hole in the forward end of the bracket 1.

The pull rod 12 is provided at its rear end with a handle 25 for pulling the rod by the driver. The pedal 8 has a pad 26 mounted on the rear end thereof providing a wide surface for the driver to apply pressure with his foot when the parking brake is to be applied. The reference numeral 19 shows a stopper to which the arm 9 rests in its return movement upon retraction of the pawl 10 under the force of the spring 18 so as to be held in its rest position.

In operation, when the parking brake is to be applied, the driver depresses the pedal 8, thereby rotating the arm 9 upwardly as shown in dotted line in FIG. 1 through the external gear 8a and internal gear 9a in normal engagement. This, in turn, causes the internal gear 9a to rotate about the step 6a so that the arm swings to an amount depending upon such depression as shown in dotted line in FIG. 1, with a speed due to the slight difference in the number of teeth in the gears. However, there is really no reason why the slight reduction of speed is made in this instance. The primary object of the gearing is to provide the large reduction of speed of the arm 9 when it returns to the retracted position when the rod 12 is pushed to the right by the driver.

The upward swing of the arm 9 is accompanied by a pulling on the cable 17 attached at 16 on clevis 15, the ratchet teeth 8a being turned through an angle in a counterclockwise direction in the amount of movement of pedal 8 and being locked securely by means of the spring biased pawl 10 so as to hold the parking brake in set condition.

The instant the driver pushes forwardly on handle 25, the straight line movement of the rack 12a causes the gear 6c to rotate about the shaft 6 in a clockwise direction in FIG. 1 so that the eccentric step 6a swings the internal gear 9a into mesh with the external gear 8a. The swing of the internal gear 9a causes itself to rotate about the step 6a with a speed due to the difference in the number of teeth in the gears. As the gear 9a is ordinarily provided with one or two teeth more than the gear 8a, it leaves one or two teeth in disengaged state with the teeth of the gear 8a to each cycle of the swing. Thus, there is one or two teeth space difference in the relative position of the gear 9a, and a corresponding difference in the position of the work head end of the arm 9 at each rotation of the shaft 6. As the gear 8a is in fixed condition during this operation by the force of the spring 18, the one or two teeth space difference results in a corresponding difference in the position of the work head of the arm 9 at each cycle of swing of the internal gear 9a.

The fact that the gear 9a has one or two more teeth than the gear 8a makes possible the large speed ratio between the driver gear 8a and driven gear 9a, i.e. between pull rod 12 and arm 9.

It may be well to point out here that a gradual pushing of the pull rod 12 will cause a rotation of the internal gear 9a with a speed largely reduced due to the slight difference in the number of teeth in the gears, as a result, the arm 9a which is a driven member will oscillate at a rate of speed depending upon the amount of the pushing of the rod 12.

It will be found that from such a large reduction of speed, any desirable and moderated amount of release of the brake can readily be obtained, which heretofore has not been obtained.

The instant the driver pushes the handle 25 until its cam 12b engages with the end 10a of the pawl 10, the oscillation of the pawl in a clockwise direction causes the pawl to disengage with the ratchet teeth 8b. Upon the release, the pedal 8 is swung back both under pull of the parking brake cable 17 and the tension of the spring 18, and, of course, arm 9 returns to its initial position, releasing the brake cable 17. The force necessary to return the arm 9 until it rests on the stop 19 is transmitted from the spring 18 through the gears 8a and 9a, which force is supplemented by the tension of the parking brake cable 17.

As soon as the rod 12 is released from the driver's hand, the rod returns to its initial position under the force of the spring 14.

It will be apparent that many modifications may be effected without departing from the scope of the novel concepts of the present invention.

I claim:

1. In combination in a foot-operated hand-released brake mechanism, a fixed bracket, a brake-operating pedal pivotally mounted on a shaft on said bracket in parallel relationship thereto having an arcuate series of ratchet teeth on its peripheral edge, a pawl pivotally mounted on and parallel to said bracket and engaging said ratchet teeth to hold the brake in applied position, spring means normally urging said pawl toward locking engagement with said ratchet teeth, said pedal having an external gear provided thereon concentrically to said shaft, an internal gear eccentric to and rotatable on said shaft in mesh with said external gear and being connected with a brake cable, said shaft having a gear provided thereon, a pull rod reciprocable relative to said bracket and having a rack for rotation of said shaft.

2. The brake mechanism of claim 1 wherein said pull rod has a cam surface so as to be engaged with said pawl for disengagement of the pawl with said ratchet teeth.

3. The brake mechanism of claim 1 wherein said shaft has two steps, one of said steps is concentric to said shaft and rotatably bears said pedal thereon while the other step is eccentric to said shaft and rotatably bears said internal gear thereon.

4. The brake mechanism of claim 1 wherein said internal gear has an arm fixed thereto, at the end of which is attached the brake cable.

5. The brake mechanism of claim 1 wherein said pull rod has a spring means anchored at one end on said bracket and at the other end on said pull rod.